United States Patent [19]

Khair

[11] Patent Number: 5,771,868
[45] Date of Patent: Jun. 30, 1998

[54] TURBOCHARGING SYSTEMS FOR INTERNAL COMBUSTION ENGINES

[75] Inventor: Magdi K. Khair, San Antonio, Tex.

[73] Assignee: Turbodyne Systems, Inc., Carpinteria, Calif.

[21] Appl. No.: 887,791

[22] Filed: Jul. 3, 1997

[51] Int. Cl.$^6$ .............................. F02M 25/07; F02B 33/44
[52] U.S. Cl. ............................ 123/570; 60/605.2; 60/609
[58] Field of Search .................................... 123/569, 570; 60/605.2, 599, 609, 612

[56] References Cited

U.S. PATENT DOCUMENTS

| | | | |
|---|---|---|---|
| 4,215,550 | 8/1980 | Dinger et al. | 60/605.2 |
| 4,231,225 | 11/1980 | Aya | 60/605.2 |
| 4,730,457 | 3/1988 | Amada et al. | 60/609 |
| 5,142,866 | 9/1992 | Yanagihara et al. | 60/605.2 |
| 5,425,239 | 6/1995 | Gobert | 60/605.2 |
| 5,611,204 | 3/1997 | Radovanovic et al. | 60/605.2 |
| 5,615,554 | 4/1997 | Gobert | 60/609 |
| 5,617,726 | 4/1997 | Sheridan et al. | 60/605.2 |
| 5,657,630 | 8/1997 | Kjemtrup et al. | 60/605.2 |

*Primary Examiner*—Willis R. Wolfe
*Attorney, Agent, or Firm*—Brinks Hofer Gilson & Lione

[57] ABSTRACT

Systems with exhaust gas recirculation and two-stage charge air compression include an internal combustion engine having an exhaust manifold and an intake manifold; a turbocharger with an exhaust gas turbine and a compressor, each having an inlet and an outlet; a first exhaust gas conduit connecting the exhaust gas turbine inlet with the exhaust manifold; a charge air conduit connecting the turbocharger compressor outlet with the intake manifold; a motor-driven compressor having an inlet and an outlet, with the outlet connected with the inlet of the turbocharger compressor; a two-input proportioning gas control valve having a first inlet open to atmosphere and a second inlet connected with an EGR conduit connected with the flow of exhaust gas from the internal combustion engine, and an outlet to deliver a mixture of air and exhaust gas to the inlet of the motor-driven charge air compressor; and a control operating the two-input proportioning gas control valve to mix in controlled proportions, air from atmosphere and exhaust gas from the internal combustion engine for further compression of the mixture of air and exhaust gas for the intake manifold of the internal combustion engine. The control can be provided with algorithm for control of the two-input proportioning gas control valve to provide an optimal mixture of recirculated exhaust gas and air for operation of the internal combustion engine with reduced NOx. Such systems can include a bypass conduit and a check valve between the inlet and outlet of the motor-driven charge air compressor, an EGR cooler to provide cooled EGR to the second input of the two-input proportioning gas control valve, an EGR particulate filter or trap, and an intercooler for the compressed charge air.

19 Claims, 1 Drawing Sheet

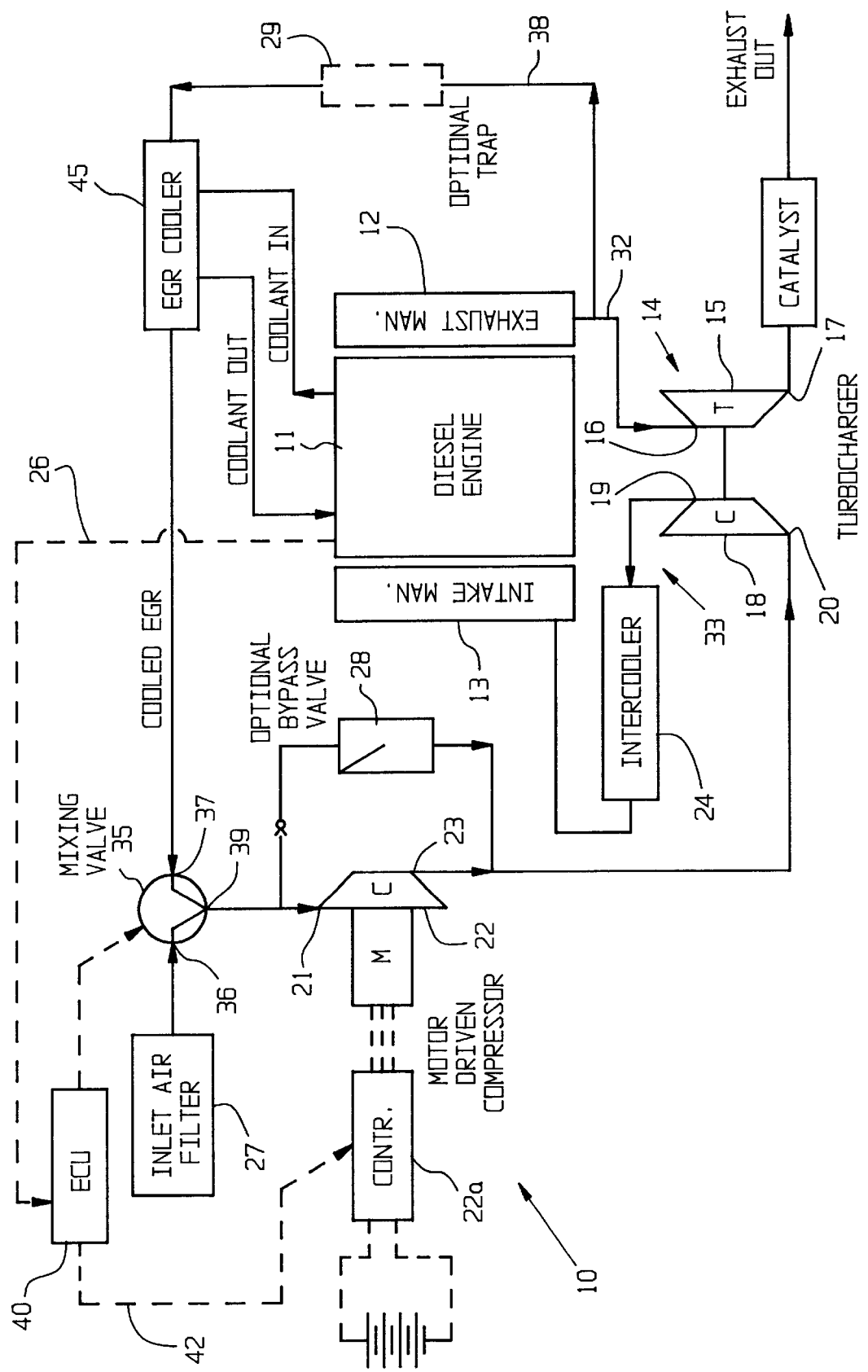

TURBOCHARGING SYSTEMS FOR INTERNAL COMBUSTION ENGINES

FIELD OF THE INVENTION

This invention relates generally to internal combustion engine systems for improving the low-speed performance of internal combustion engines and for lowering objectionable engine emissions.

BACKGROUND OF THE INVENTION

Increasing the power output of a given size internal combustion engine, e.g., a diesel engine, by supercharging has been common practice for decades. Turbocharging has evolved as a preferred method because of its utilization of exhaust gas energy to drive a compressor rather than mechanically connecting the compressor to the engine. Turbocharging results in lower fuel consumption, higher power output potential, and compensation for air density loss when engines are operated at high altitude.

The capability of modern engines to produce more power from a given cylinder displacement has been steadily increased due to engineering innovation and development, and modern engines can utilize higher charge air pressures than a single turbocharger can provide. Thus, a number of high specific power diesel engines employ two turbochargers with their turbines and their compressors connected in series. In a typical arrangement of series turbochargers, one turbocharger is mounted on the exhaust manifold and comprises a high pressure stage, and a second turbocharger comprises a low pressure stage. The turbine of the high pressure stage receives exhaust gas from the manifold and the low pressure stage turbine receives exhaust gas from the high pressure stage and discharges it to the atmosphere. The low pressure stage compressor takes in air from the atmosphere, compresses it, and delivers it to the high pressure stage compressor, sometimes through a charge air cooler. The high pressure compressor stage accomplishes a second stage of charge air compression before delivering the charge air to the intake manifold. The two turbochargers in series present a complicated and expensive means of supplying highly compressed air to an internal combustion engine.

In the near future, heavy-duty engines will be required to meet lower levels of nitrogen oxide (NOx), hydrocarbon (HC) and particulate emissions. Proposals for future emissions regulations are calling for stricter nitrogen oxide while keeping particulate matter standards at their current level. In June of 1996, the EPA proposed a plan for reducing pollution from heavy trucks, which calls for NOx+HC emissions of 2.4 G/BHP-HR and particulate matter of 0.10 G/BHP-HR by 2004.

One method of reducing NOx emissions is exhaust gas recirculation, a technique used in some light-duty diesels and in passenger car gasoline engines. Exhaust gas recirculation (frequently referred to as "EGR") reduces NOx in internal combustion engines by diluting the charge air and depressing the maximum temperature reached during combustion. However, a detrimental effect of EGR is a resulting increase in particulates. Government regulations dictate that particulate emissions must be held to a level of 0.10 G/BHP-HR by the year 2004.

Particle traps have been used in dealing with the insoluble diesel particulate problem. This method of diesel exhaust after treatment has been traditionally characterized by high cost and low reliability. Recent developments in passively regenerated traps using fuel additive catalyzing agents have emerged as a lower cost alternate to conventional active regeneration trap systems.

In turbocharged heavy-duty diesel engines it is sometimes difficult to introduce EGR into the intake manifold because turbocharged intake manifold pressures are usually greater than exhaust system pressures. To circumvent this problem exhaust gas has been intercepted at a point upstream of the engine turbocharger where pressure is generally higher than that of the intake manifold. This approach is commonly referred to as high pressure loop (HPL) EGR.

While high pressure loop EGR applied to several heavy-duty diesel engines has been effective in reducing NOx to the 2.0 G/BHP-HR., diverting exhaust gas for EGR upstream of the turbocharger turbine reduces the exhaust gas energy available to drive the turbocharger. The penalty associated with such a system, is an increase in fuel consumption and an associated increase in particulate matter emissions. With a trap-based, after-treatment system, control of the particulate matter may be achieved; however, the fuel consumption penalty remained unresolved.

Another EGR configuration preserves turbocharger performance by supplying exhaust gas for recirculation from a point downstream of the turbocharger. At this location, exhaust gas pressure is at a lower level than that of the intake manifold and the EGR can be introduced in the system upstream of the turbocharger compressor. The pressure difference in such systems can be generally adequate for EGR flow rates needed to reduce NOx to the 2.0 G/BHP-HR level. This configuration is known as the low pressure loop (LPL) EGR system.

The advantages of the LPL EGR system over the HPL EGR system include:

1) Lower fuel consumption from that of the HPL configuration as a result of better turbocharger performance than that of the HPL configuration.

2) With the presence of a particulate trap, the LPL EGR supplies filtered exhaust with possible improved engine durability.

3) Because exhaust gas downstream of the trap is cooler than that provided from upstream of the turbocharger (as in the HPL case), LPL EGR would have a higher heat absorbing capacity for rates similar to those of the HPL EGR rates.

4) With cooler EGR there is a possibility of reducing the size of the EGR cooler and providing a more compact unit.

5) Reducing the EGR cooling requirement may help prevent exhaust system condensation and potential erosion of the turbocharger compressor wheel.

6) EGR and fresh charge air mixing may be improved by introducing the mixture upstream of the turbocharger compressor.

Diesel engines have an excellent appetite for the EGR at low idle and no load engine conditions where they experience extremely high air-to-fuel (A/F) ratios relative to those of the gasoline engine. At peak torque and rated speed/full load diesel engine conditions, typical A/F ratios are 25 to 30:1, respectively. Therefore, it is desirable to avoid employing EGR at these conditions to reduce or prevent smoke formation.

Motor-assisted turbochargers have been used to improve internal combustion engine performance by supplementing the energy of the exhaust gas at low engine speed with electrical energy applied to an electric motor that assists the turbocharger turbine in driving the turbocharger charge air compressor. When there is a need for engine acceleration from low speed or an increased engine load, the electric motor can be energized and respond by increasing the turbocharger compressor's rotational speed, providing additional boost, and thus improving the engine's response at low speed and to increased loads. As engine speeds increase, for example, beyond peak torque speed, the engine turbocharger can develop the high boost required for the proper engine performance and low exhaust emissions, and the electric motor can be deenergized.

BRIEF SUMMARY OF THE INVENTION

The invention provides internal combustion engine systems and methods with two-stage charge air compression and exhaust gas recirculation.

Systems of the invention with exhaust gas recirculation and two-stage charge air compression include an internal combustion engine having an exhaust manifold and an intake manifold; a turbocharger with an exhaust gas turbine and a compressor, each having an inlet and an outlet; a first exhaust gas conduit connecting the exhaust gas turbine inlet with the exhaust manifold; a charge air conduit connecting the turbocharger compressor outlet with the intake manifold; a motor-driven compressor having an inlet and an outlet, with the outlet connected with the inlet of the turbocharger compressor; a two-input proportioning gas control valve having a first inlet open to atmosphere and a second inlet connected with an EGR conduit connected with the flow of exhaust gas from the internal combustion engine, and an outlet to deliver a mixture of air and exhaust gas to the inlet of the motor-driven charge air compressor; and a control operating the two-input proportioning gas control valve to mix in controlled proportions, air from atmosphere and exhaust gas from the internal combustion engine for further compression of the mixture of air and exhaust gas for the intake manifold of the internal combustion engine.

Systems of the invention can include a bypass conduit and a check valve between the inlet and outlet of the motor-driven charge air compressor, an EGR cooler to provide cooled EGR to the second input of the two-input proportioning gas control valve, an EGR particulate filter or trap, and an intercooler for the compressed charge air.

Systems of the invention include a control provided with engine operating signals from the internal combustion engine, and the control can be provided with algorithm for control of the two-input proportioning gas control valve to provide an optimal mixture of recirculated exhaust gas and air for operation of the internal combustion engine with reduced NOx.

The invention also provides a method of operating an internal combustion engine with exhaust gas recirculation and two-stage compression of its charge air, comprising: intercepting a flow of exhaust gas from the internal combustion engine, directing the flow of exhaust gas for mixing, providing a flow of air for mixing with the exhaust gas, mixing the flows of air and exhaust gas in controlled proportions into a mixture of exhaust gas and air, controlling proportions of air and exhaust gas in the mixture, compressing the mixture of exhaust gas and air, directing the compressed mixture of exhaust gas and air to the input of a turbocharger compressor, and further compressing the compressed mixture of exhaust gas and air with the turbocharger compressor and directing the resulting further compressed mixture to the intake manifold of the internal combustion engine.

In the method of the invention, the flows of air and exhaust gas are compressed and controlled in mixing to provide an optimal reduction of NOx and particulate matter in the exhaust gas of the internal combustion engine, and such methods can include the further steps of sensing engine speed, determining when the engine is operating below peak torque speed, sensing engine loading and reducing the exhaust gas proportion in the mixture as the engine loading increases. The method can include the further step of terminating the compression of a substantially all air mixture by the motordriven compressor as charge air for the internal combustion engine at high engine speeds. In methods of the invention, the recirculated exhaust gas is preferably cooled before its mixing with air and may be filtered to remove particulate matter.

Other features and advantages of the invention will be apparent to those skilled in the art from the drawings and more detailed description of the invention that follows.

BRIEF DESCRIPTION OF THE INVENTION

FIG. 1 illustrates a system of the invention with two-stage compression of charge air and exhaust gas recirculation for an internal combustion engine.

DETAILED DESCRIPTION OF THE BEST MODE OF THE INVENTION

FIG. 1 illustrates a system 10 of the invention with two-stage charge air compression and high pressure loop exhaust gas recirculation.

The system of FIG. 1 includes: an internal combustion engine 11 including an exhaust manifold 12 and an intake manifold 13; a turbocharger 14 having an exhaust gas turbine 15 with an inlet 16 and an outlet 17, and a charge air compressor 18 with an outlet 19 and inlet 20; an exhaust gas conduit 32 connecting the exhaust gas turbine inlet 16 with the exhaust manifold 12 and a charge air conduit 33 connecting the charge air compressor outlet 19 with the intake manifold 13, preferably through an intercooler 24; a motor-driven compressor 22 having an inlet 21 and outlet 23 with its outlet 23 being connected with the inlet 20 of the charge air compressor 18; a two-input proportioning gas control valve 35 having a first inlet 36 open to atmosphere, and a second inlet 37 connected with an exhaust gas conduit means 38 to deliver EGR from the internal combustion engine 11, and an outlet 39 connected with the inlet 21 of the motor-driven compressor 22; and a control 40 to operate the two-input proportioning gas control valve 35 to mix, in controlled proportions, air from atmosphere and exhaust gas from the internal combustion engine and admit the mixture to the inlet 21 of the motor-driven charge air compressor 22.

In the illustrated system of FIG. 1, the flow of exhaust gas from the internal combustion engine is intercepted between the exhaust manifold 12 and the turbocharger turbine inlet 16 at substantially the pressure of the exhaust manifold and the system of FIG. 1 provides what has been referred to as high pressure loop exhaust gas recirculation (HPL EGR).

The control 40, which is preferably a microprocessor-based control, is provided with engine operation signals over an electrical connection 26 from sensors and signal generators, for example, for engine speed, and engine throttle and load demands, at the internal combustion engine. The control 40 can operate the motor-driven compressor 22, through a connection 42 and a power controller 22a for its motor, to provide charge air compression when needed, as at low engine speeds and in response to acceleration demands and increased loads and to a need for increased air to reduce objectionable emissions.

The amount of exhaust gas required in the charge air mixture to limit objectionable emissions, such as NOx, to predetermined levels can be determined by laboratory testing of an engine over its entire speed and load range. The amount of exhaust gas needed in the charge air mixture at various speeds and loads can then be programmed into the microprocessor of the control 40. When the control 40 receives signals of engine speed and load, it can then position the mixing valve 35 so that the predetermined amount of EGR is present in the charge air mixture being fed to the engine intake manifold. The motor-driven compressor 22 can increase the pressure of the mixture of exhaust gas and air for delivery to the intake manifold 13 at low idle speeds, during acceleration of the engine from low idle speeds and at other desirable times. When the turbocharger 14 is supplied with enough exhaust gas energy to be able to supply sufficient charge air to the engine by itself, the motor-driven compressor 22 can be de-energized and bypassed, if necessary or desirable, through the bypass check valve 28.

The system of FIG. 1 provides control of both EGR and power augmentation of the internal combustion engine. Exhaust gas recirculation is provided from the internal combustion engine and can be supplied through an EGR cooler 45 to reduce its temperature and increase its emission reduction effectiveness, and, if desired, through a particulate removal means 29 in the EGR path. The two-input proportioning gas control valve 35 serves as a junction point between the cooled EGR and fresh filtered air. The gas control valve 35 controls the charge mixture supplied to the motor-driven generator 22, and the mixture effected by the gas control valve 35 depends upon the internal combustion engine and its operating conditions and the desired rate of the exhaust gas recirculation for a given emission reduction. At low idle speed and in partial load conditions for the internal combustion engine, the gas control valve 35 will allow a mixture of fresh air and exhaust gas into the motor-driven compressor 22, the proportions of the mixture being determined by the emission reduction algorithm for the internal combustion engine and its operating conditions. At speeds below peak torque speed and as the load increases, the gas valve control 35 will gradually reduce proportion of exhaust gas in the mixture and increase the proportion of air to the point where substantially 100 percent air is provided by the gas control valve 35 to the motor-driven compressor 22 at full engine load conditions. In addition, the motor-driven compressor 22 can be operated by the control 40 to provide increased charge air to the internal combustion engine 11 at low engine speeds, when the internal combustion engine operator demands engine acceleration, and when the load on the internal combustion engine increases. Thus, combined control of the gas control valve 35 and the motor-driven compressor 22 can improve both engine performance and engine emissions at speeds below peak torque speed.

Above peak torque speed, the turbocharger 14 can usually be well matched to the engine charge air requirements for smoke control; therefore, in systems of the invention, the motor-driven compressor 22 may be used only at engine speeds below those of peak torque speed; however, it provides the capability of providing low emission operation under a variety of engine operating conditions.

As indicated in FIG. 1, the motor-driven compressor 22 may be provided with a bypass including a check valve 28 for operation of the system at engine full load conditions and at speeds above peak torque speed where the motor-driven compressor 22 will usually be inoperative. The bypass for the motor-driven compressor is preferably provided to avoid potential flow restrictions that might be caused by an inoperative motor-driven compressor 22 at full load conditions, permitting fresh air, or a mixture of EGR and fresh air to proceed to the intake manifold 13 without substantial restriction by the motor-driven compressor 22.

Systems of the invention can alleviate problems caused by solid particulate matter, such as insoluble or carbonous matter, and its adverse effect on the two-stage compressors and intercooler that deliver the exhaust gas recirculation mixture to the intake manifold by operating the motor-driven compressor 22 to provide adequate fresh air to compensate for any drop in the air fuel ratio during engine operation and thereby avoid soot formation; however, the conduit for EGR, e.g., conduit 38, may be provided with a particle filter or trap 29.

Systems of the invention can thus operate an internal combustion engine by intercepting a flow of exhaust gas from the internal combustion engine, directing the flow of exhaust gas for mixing, providing a flow of air for mixing with the exhaust gas, mixing the flows of air from exhaust gas in controlled proportions into a mixture of exhaust gas and air, controlling proportions of exhaust gas in the air and the mixture, compressing the mixture of exhaust gas and air, directing the compressed mixture exhaust gas and air to a second stage compressor, such as the turbocharger compressor 18 and further compressing the compressed mixture exhaust gas and air and directing the resulting further compressed mixture as charge air for an internal combustion engine.

In methods of the invention, the flows of air and exhaust gas are controlled in mixing to provide an optimal reduction of NOx in the exhaust gas of the internal combustion engine. The method further includes the steps of sensing engine speed, determining when the engine is operating below peak torque speed, sensing engine loading, and reducing the proportion of exhaust gas in the EGR mixture as engine loading increases to a point where the mixture is substantially all air at full engine loading. In methods of the invention, the two-stage compression of the substantially all air mixture can be terminated by a control.

As noted above, the illustrated method of the invention includes interception of the exhaust gas at substantially the pressures of the exhaust gas manifold, providing high pressure loop exhaust gas recirculation (HPL EGR).

The system's invention disclosed in FIG. 1 provides two-stage compression of the charge air for the internal combustion engine. In the system of FIG. 1 the first compression stage is provided by the motor-driven compressor 22 and the second stage of compression is provided by the charge air compressor 18 of the turbocharger 14. Charge air is preferably induced into the system through an inlet air filter 27.

The drawings and description above are directed to those embodiments of the invention that are currently believed to be preferred; however, those skilled in the art will recognize that the invention may be embodied in other systems and embodiments without departing from the scope of the invention as set forth in the following claims.

I claim:

1. An internal combustion engine system, comprising
   an internal combustion engine including an exhaust manifold and an intake manifold;
   a turbocharger having an exhaust gas turbine with an inlet and an outlet and charge air compressor with an inlet and an outlet;
   an exhaust gas conduit means connecting the exhaust gas turbine inlet with the exhaust manifold, and a charge air conduit connecting the turbocharger charge air compressor outlet with the intake manifold;

a motor-driven compressor having an inlet and an outlet, with its outlet connected with the inlet of the turbocharger charge air compressor;

a two-input proportioning gas control valve having one inlet open to atmosphere and a second inlet connected with a flow of exhaust from said internal combustion engine and having an outlet connected with the inlet of said motor-driven compressor; and a control, said control operating said two-input proportioning gas control valve to mix in controlled proportions air from atmosphere and exhaust gas from said exhaust manifold and admit the mixture to the inlet of motor-driven charge air compressor.

2. The system of claim 1 further comprising a bypass conduit and check valve between the inlet and outlet of the motor-driven charge air compressor.

3. The system of claim 1 wherein said exhaust gas conduit means comprises an exhaust gas cooler connected to provide a cooled flow of exhaust gas to said second inlet of said two-input proportioning gas control valve.

4. The system of claim 3 wherein said exhaust gas cooler is connected with a coolant of said internal combustion engine.

5. The system of claim 1 wherein said control includes algorithm for calculation of proportions of exhaust gas and air needed for NOx reduction in the exhaust gas of the internal combustion engine.

6. The system of claim 1 wherein said exhaust gas conduit means comprises a first exhaust gas conduit connected between the exhaust manifold and the turbocharger exhaust gas turbine inlet and a second exhaust gas conduit connected between the first exhaust gas conduit and the second inlet of the two-input proportioning gas control valve.

7. The system of claim 6 wherein the second exhaust gas conduit includes an exhaust gas cooler.

8. The system of claim 7 wherein the second exhaust gas conduit includes a particulate trap.

9. The system of claim 1 wherein the system includes signal generators for signals of engine speed and engine load, and the control is connected with the signal generators.

10. The system of claim 9 wherein the control operates the motordriven compressor in response to engine speed and engine load signals.

11. A method of operating an internal combustion engine, comprising:

intercepting a flow of exhaust gas from the internal combustion engine, directing the flow of exhaust gas for mixing, providing a flow of air for mixing with the exhaust gas, mixing the flows of air and exhaust gas in controlled proportions into a mixture of exhaust gas and air, controlling the proportions of air and exhaust gas in the mixture, compressing the mixture of exhaust gas and air, directing the compressed mixture of exhaust gas and air to the compressor input of an exhaust gas turbine driven compressor, and further compressing the compressed mixture of exhaust gas and air with the exhaust gas driven compressor and directing the resulting compressed mixture as charge air for the internal combustion engine.

12. The method of claim 11 wherein the air and exhaust gas are controlled in mixing to provide an optimal reduction of NOx in the exhaust gas of the internal combustion engine.

13. The method of claim 12 including the further steps of sensing engine speed, determining when the engine is operating below peak torque speed, sensing engine loading, and controlling the proportion of exhaust gas in the mixture in response to engine operating conditions.

14. The method of claim 13 wherein the mixture is controlled to reduce exhaust gas in the mixture as engine loading increases.

15. The method of claim 14 including the further step terminating the compression of a substantially all air mixture directed to the compressor input of the turbocharger for the internal combustion engine.

16. The method of claim 11 wherein the flow of exhaust gas is intercepted in its flow between the exhaust manifold and the exhaust gas turbine.

17. The method of claim 11 wherein the intercepted flow of exhaust gas is cooled before mixing with the flow of air.

18. The method of claim 11 wherein the intercepted flow of exhaust gas is filtered to remove particulates before the EGR cooler and mixing with the flow of air.

19. The system of claim 11 wherein the resulting compressed mixture is cooled before its delivery to the internal combustion engine as charge air.

* * * * *